United States Patent [19]

Blom

[11] 4,227,216
[45] Oct. 7, 1980

[54] GAMMA CORRECTION CIRCUIT FOR TELEVISION

[75] Inventor: Hendrik Blom, Breda, Netherlands

[73] Assignee: U.S. Philips Corporation, New York, N.Y.

[21] Appl. No.: 956,308

[22] Filed: Oct. 31, 1978

[30] Foreign Application Priority Data

Nov. 28, 1977 [NL] Netherlands ............... 7713052

[51] Int. Cl.² .................................. H04N 5/20
[52] U.S. Cl. ....................................... 358/164
[58] Field of Search .......................... 358/164, 32

[56] References Cited

U.S. PATENT DOCUMENTS

| 3,970,774 | 7/1976 | Bazin et al. | 358/164 |
| 4,018,988 | 4/1977 | Seer, Jr. | 358/164 |
| 4,104,678 | 8/1978 | Van Roessel | 358/164 |

Primary Examiner—Richard Murray
Attorney, Agent, or Firm—Thomas A. Briody; William J. Streeter; Edward W. Goodman

[57] ABSTRACT

A television gamma correction circuit in which a gamma corrector supplies an output signal having a minimum gamma equal to two, from which, relative to a linear input signal which is limited via a signal limiter circuit to the peak-white value, a correction signal is derived, with positive values only intended for increasing the gamma of the output signal of the gamma corrector. In this way scene details produced when the peak-white value is exceeded are prevented from being displayed with a lower picture brightness than associated with the peak-white value.

7 Claims, 2 Drawing Figures

4,227,216

GAMMA CORRECTION CIRCUIT FOR TELEVISION

BACKGROUND OF THE INVENTION

The invention relates to a gamma correction circuit for television, comprising a gamma corrector connected to a circuit input to which the input signal to be gamma-corrected is applied, a first superposition stage for forming a correction signal at the output thereof, this stage comprising a first input connected to the gamma correction output and a second input connected to the circuit input, the output of the first superposition stage being connected to a first input of a second superposition stage a second input of which carries a signal to be corrected, the output connected to the circuit output carrying a gamma-corrected output signal.

Such a gamma correction circuit is disclosed in German Auslegeschrift No. 17 62 353. It is described that the signal to be corrected, which is applied to the second input of the second superposition stage is the input signal appearing at the circuit input. It follows that the gamma-corrected output signal is formed from the input signal to be gamma-corrected and the adjustable gamma-determining correction signal. When the gamma adjustment is changed, the black level and the peak-white value of the output signal remain unchanged in known manner. The result is that any desired gamma correction can be adjusted between the fixed black level and the fixed peak-white value.

A problem is encountered for input signal values which exceed the peak-white value. This situation, in which input signal values exceed the peak-white value, is caused by fierce light-reflecting or flashing scene details and frequently occurs at normal scene recordings. The problem consists in that, assuming a linearly increasing input signal from black level to beyond the peak-white value, the output signal of the gamma corrector exceeds the linear input signal between black level and peak-white value and is smaller beyond the peak-white value, so that the correction signal between black level and the peak-white value enlarges the input signal, that is to say it furnishes the gamma correction but, on the contrary, reduces the input signal beyond the peak-white value. Put differently: the correction signal is positive between black level and the peak-white value and negative for values exceeding the peak-white value. For the displayed picture this means that a fierce light-reflecting or flashing scene detail is displayed with a brightness which is below, instead of above, a brightness associated with the peak-white value. This makes a strange impression on the viewer, who expects a local higher picture brightness for the scene detail but sees a markedly lower picture brightness, lower than associated with the peak-white value.

SUMMARY OF THE INVENTION

The problem described can be solved in a simple manner by means of the circuit according to the invention, which can be implemented without additional active components relative to the known circuit, that is to say with two differential amplifiers. The gamma correction circuit is therefore characterized in that the circuit input is connected to an input of the first superposition stage via a signal limiter circuit, while the second input of the second superposition stage is connected to the output of the gamma corrector, the gamma-corrected output signal at the circuit output being formed from the output signal having a minimum gamma of the gamma corrector and the adjustable, gamma-increasing correction signal originating from the first superposition stage.

The use of the minimum gamma from which the gamma-increasing correction signal is derived and limiting the input signal so that a negative correction signal portion cannot be produced achieves that signal transgressions at the input signal of a peak-white value are fixed at the peak-white value in the gamma-corrected output signal. As a result thereof the fierce light-reflecting and flashing scene details are displayed with the picture brightness associated with the peak-white value and not with a lower picture brightness.

A simple embodiment of the circuit providing a very good fixation at the peak-white value in the gamma-corrected output signal is characterized in that the first superposition stage comprises three inputs connected to resistors whose other ends are interconnected, the second input being connected directly and the third input via the limiter circuit to the circuit input, while the second superposition stage comprises a fed-back differential amplifier the inverting input of which is connected to the first input via a variable resistor and to the second input via a resistor.

A simple embodiment of the signal limiter circuit is characterized in that the limiter circuit comprises, as regards the pass direction, two oppositely arranged diodes between the input and the output, the junction of the diodes being connected to a supply terminal via a resistor.

A very feasible gamma correction can be realized by means of a gamma correction circuit which is characterized in that the gamma corrector furnishes a minimum gamma of approximately two in the corrector output signal.

A gamma correction circuit stabilised against temperature influences is characterized in that the gamma corrector comprises a differential amplifier the output of which is connected to a supply terminal via parallel voltage dividers and a diode, a junction of each voltage divider being connected to the inverting input of the differential amplifier via a diode and the output of the differential amplifier further being connected to the inverting amplifier input via a diode and a resistor and to the supply terminal via the same diode and a resistor, the junction of diode and resistor constituting the output of the gamma corrector.

DESCRIPTION OF THE DRAWINGS

The invention will be further explained, by way of non-limitative example, with reference to the following Figures wherein.

DESCRIPTION OF THE PREFERRED EMBODIMENT

Figure 1:
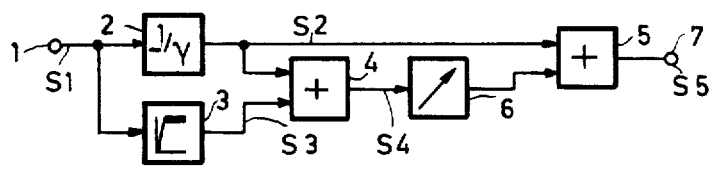
FIG. 1 illustrates by means of a block diagram a gamma correction circuit according to the invention.
Figure 2:
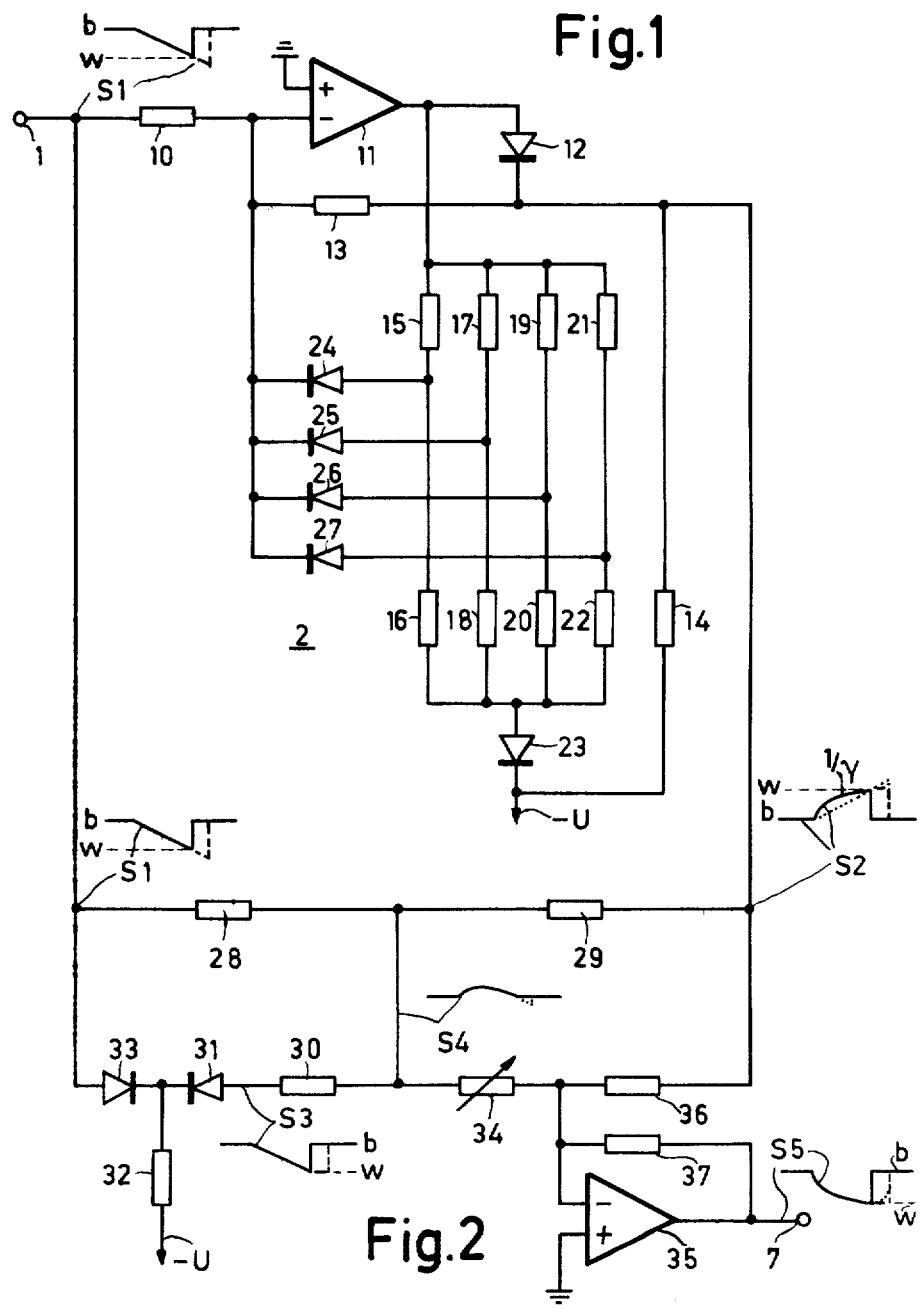
FIG. 2 illustrates another, more detailed, embodiment of the circuit.

In FIG. 1 reference 1 denotes a circuit input to which an input signal S1 to be gamma corrected is applied FIG. 2 shows schematically the input signal S1 at the circuit input 1. The input signal S1 is shown in the drawing by means of solid lines with a linear increase from a black level b onwards to a peak-white value w whereafter a further linear increase occurs, shown in the drawing by means of a dashed line, until after a certain transgression of the peak-white value w the signal S1 returns to the black level b. Without the dashed line portion the signal S1 furnishes a nominal video signal which varies between black level b and peak-white value w, while the dashed line portion furnishes a possible peak-white value transgression which may be in practice, for example, double or more the value (w-b).

In FIG. 1 the circuit input 1 is connected to the input of a gamma corrector 2 and the input of a signal limiter circuit 3. The outputs of the corrector 2 and the circuit 3 carrying the signals S2 and S3, respectively, are connected to inputs of a superposition stage 4. The output of the corrector 2 is also connected to the input of a superposition stage 5, another input of which is connected, via an adjusting stage 6, to the output, carrying the correction signal S4, of the stage 4. The output of the stage 5 is connected to a circuit output 7 which carries the signal S5. Although the described implementation of the circuit of FIG. 1 is not fully identical to the detail circuit shown in FIG. 2, the signals S2 to S5 inclusive shown there are also suitable for the circuit of FIG. 1, which shows a simpler embodiment.

A comparison of the signals S1 and S2 of FIG. 2 shows that the gamma corrector 2 supplies an inverted signal, corrected with a certain gamma $(1/\gamma)$. The signal S2 shows, for comparing it with the signal S1, the linear increase by means of a dotted line. From the signal S3 shown in FIG. 2 it follows that the limiter circuit 3 of FIG. 1 furnishes a limitation of the signal S1 to the peak-white value w. The correction signal S4, which is formed from the signals S2 and S3 in accordance with FIG. 1 and from the signals S1, S2 and S3 in accordance with FIG. 2, is shown schematically in FIG. 2 and has, in both cases, approximately the same variation. It is important that the signal portions, shown by means of solid and dashed lines, of the signals (S1), S2 and S3 furnish approximately the correction signal S4, shown by means of a solid line. It appears that the solid-line correction signal S4 of FIG. 2 furnishes only a positive and no negative contribution. If, however, the limited signal S3 would be absent and the signal S1 would only be utilized for forming the correction signal, then the dotted-line negative signal portion is present in the signal S4. Adding the solid-line and dashed-line signals S2 and S4 furnishes, after inversion, the signal S5 shown by means of the same lines. To illustrate the effect obtained for the signal S5 by means of the limited signal S3 (which effect is shown by means of a dashed line) the signal variation of the signal S5 in the absence of the signal S3 is shown by means of a dotted line. From the signal S5 it appears that, instead of the decline in the signal S5 towards the black level b (dotted), which decline is caused by the transgression of the peak-white value w in the signal S1, the signal S5 is kept at the transgression more or less constant at the peak-white value w (dashed).

Consequently, on display of the gamma-corrected signal S5, fierce light-reflecting or flashing scene details are displayed with the picture brightness associated with the peak-white value and not with a considerably lower picture brightness.

In the gamma-correction circuit shown in detail in FIG. 2 the switching input 1 is connected via a resistor 10 to the inverting (−) input of a differential amplifier 11 which is connected to ground at its non-inverting input. The output of the amplifier 11 is connected to the anode of a diode 12, the cathode of which is connected via resistor 13 and 14, respectively, to the (−) amplifier 11 input and to a terminal having a negative voltage −U. The output of the amplifier 11 is further connected to the terminal carrying the voltage −U via four parallel arranged voltage dividers, each consisting of two resistors (15,16), (17,18), (19,20) and (21,22), in series with a diode 23. The junctions of the voltage dividers comprising the resistors (15,16), (17,18), (19,20) and (21,22) are respectively connected to the anodes of diodes 24, 25, 26 and 27, the cathodes of which are commonly connected to the (−) input of the amplifier 11. Thus, the gamma corrector 2 comprises the components 10 to 27 inclusive, the junction of the diode 12 and the resistors 13 and 14 constituting the gamma corrector output at which the signal S2 appears.

The gamma corrector 2 or (10–27) operates with a gamma characteristic composed of four characteristics, each having a point of change between two straight lines, the four points of change being spaced equidistantly between the black level b and the peak-white value w. Such an implementation is known per se. Advantageous for the implementation of the gamma corrector (10–27) is the use of the diodes 12 and 23 which, with a similar temperature variation during operation as the diodes 24, 25, 26 and 27, are used to compensate for temperature changes. The voltage drop across the diodes 24 to 27 inclusive, which voltage drop is affected by temperature changes, manifests itself via the diodes 23 and 12 relative to the voltage −U and the output voltage of the amplifier 11, which fixes the above-mentioned points of change independent of changes in the diode voltage drops.

Via two resistors 28 and 29 the circuit input 1 is connected to the junction of the diode 12 and the resistors 13 and 14. The junction of the resistors 28 and 29 is connected via a resistor 30 to the anode of a diode 31, whose cathode is connected via a resistor 32 to the voltage −U, the cathode furthermore being connected to the cathode of a diode 33 which is connected to the circuit input 1 at its anode. The resistors 28, 29 and 30 constitute a superposition stage (28, 29, 30) supplying at the resistor junction the correction signal S4 formed from the signals S1, S2 and S3. The signal S3 is supplied via the diodes 31 and 33 and the resistor 32 which form a signal-limiting circuit (31, 32, 33). For signal values in the signal S1 between the black level b and the peak-white value w the diodes 33 and 31 conduct so that the signal S3 has the same variation, shown by means of the solid lines, as the signal S1. On achieving the peak-white value w the diode 33 is cutoff, the voltage associated with the peak-white value w minus the voltage drop across the diode 31 is then present at the junction of the diode 31 and the resistor 32 which results in the peak-white value w in the signal S3.

The junction of the resistors 28, 29 and 30 carrying the correction signal S4 is connected via a variable resistor 34 to the (−) input of a differential amplifier 35 which is connected to ground at its (+) input. The (−) input is connected via a resistor 36 to the output, carrying the signal S2, of the gamma corrector 2, or (10–27). The (−) input of the amplifier 35 also connected via a resistor 37 to the amplifier output and the circuit output 7, which carries the signal S5. The amplifier 35 and the resistors 34 36 and 37 constitute a superposition stage (34–37) to the inputs of which the signals S4 and S2 are applied, the variable resistor 34 also being present as an adjusting stage for the signal S4.

In FIG. 1 it is assumed that the correction signal S4 is formed from the signals S2 and S3 while for the circuit shown in FIG. 2 it is described that also the signal S1 is utilized then. Utilizing only the signals S2 and S3 for forming the correction signal S4 results in that the dashed-line portion of the signal S2 furnishes above the peak-white value w a small positive contribution in the correction signal S4; this contribution is apparent in the signal S5 as a small transgression of the peak-white value w. Utilizing the signal S1 via the resistor 28 results in that this signal more or less compensates for the described positive contribution of the signal S2 by means of its negative contribution in the correction signal S4, which results in a fixing of the signal S5 at more or less the peak-white value w.

It appears that for the circuits shown in FIGS. 1 and 2 the starting point is a minimum gamma correction supplied by the gamma corrector 2 or (10–27), wherein the gamma correction can be increased at wish by the degree in which the correction signal S4 is added. For the minimum gamma of the signal S2 it holds that it must practically be about $1/\gamma = 2$, which minimum must on the one hand be sufficiently low for the minimum gamma correction in the signal S5, which is in practice always required and, on the other hand, large enough to enable, relative to the linear, or limited, signal, the generation of the correction signal S4 to a reasonable degree with acceptable noise. Choosing the minimum gamma to be equal to two is satisfactory in practice.

From the embodiment shown in FIG. 2 of the gamma correction circuit, it appears that it is sufficient to use two active components, namely the differential amplifiers 11 and 35. Relative to said German Auslegeschrift 1762353 which describes a circuit also having only two differential amplifiers, the present application has the advantage that, when using this minimum number of amplifiers, the described correction can further be obtained at the output signal.

What is claimed is:

1. A gamma correction circuit for television having an input, to which a signal to be gamma corrected is applied, and an output, wherein said gamma correction circuit comprises a gamma corrector coupled to said circuit input; a signal limiter also coupled to said circuit input; a first superposition stage, for forming a correction signal having a first and a second input and an output, said first input thereof being coupled to said gamma corrector and said second input thereof being coupled to said signal limiter circuit; and a second superposition stage having a first and a second input and an output, said first input thereof being coupled to the output of said first superposition stage and said second input thereof being coupled to said gamma corrector, said output thereof corresponding to said gamma correction circuit output, whereby the gamma-corrected output signal is formed by combining in said second superposition stage the output from said gamma corrector, having a minimum gamma, and the gamma-increasing correction signal at the output of said first superposition stage.

2. A gamma correction circuit as claimed in claim 1 wherein said first superposition stage further comprises a third input coupled to said gamma correction circuit input.

3. A gamma correction circuit as claimed in claim 2 wherein said first superposition stage comprises three resistors each having one end thereof commonly joined at the output of said first superposition stage and said first, second and third inputs thereof corresponding to the other ends of said three resistors.

4. A gamma correction circuit as claimed in claim 1, wherein said second superposition stage comprises a fed-back differential amplifier having an inverting input, a variable resistor coupled to said inverting input and a fixed resistor also coupled to said inverting input wherein said variable resistor corresponds with said first input and said fixed resistor corresponds with said second input thereof.

5. A gamma correction circuit as claimed in claim 1, wherein said limiter circuit comprises the series combination of two oppositely arranged diodes having the cathodes thereof joined one to the other, and a resistor connecting the junction of said diodes to a supply terminal.

6. A gamma correction circuit as claimed in claim 1, wherein said gamma corrector furnishes a minimum gamma of approximately two in the output signal therefrom.

7. A gamma correction circuit as claimed in claim 1 or 6, wherein said gamma corrector comprises a differential amplifier having an inverting input and an output; a plurality of parallel arranged voltage dividers each having a junction terminal; a plurality of first diodes respectively coupling each of said voltage dividers at the junction terminals thereof to said inverting input of said differential amplifier; a second diode connected commonly to said voltage dividers and coupling said voltage dividers to a supply terminal; and a third diode connected to said differential amplifier output and connected to a first resistor coupled to said supply terminal and to a second resistor coupled to said inverting input of said differential amplifier; wherein the junction of said third diode with said first and second resistors constitutes the output of said gamma corrector.

* * * * *